US012674861B2

(12) United States Patent　　　(10) Patent No.:　US 12,674,861 B2
Troccoli　　　　　　　　　　　　　(45) Date of Patent:　　　Jul. 7, 2026

(54) INDOOR LOCALIZATION SOLUTION FOR WIRELESS COMMUNICATION NETWORKS

(71) Applicant: Wirepas Oy, Tampere (FI)

(72) Inventor: Tiago Troccoli, Tampere (FI)

(73) Assignee: Wirepas Oy, Tampere (FI)

( * ) Notice:　Subject to any disclaimer, the term of this patent is extended or adjusted under 35 U.S.C. 154(b) by 306 days.

(21) Appl. No.: 18/501,555

(22) Filed:　Nov. 3, 2023

(65)　　　Prior Publication Data

US 2024/0159858 A1　　May 16, 2024

(30)　　Foreign Application Priority Data

Nov. 4, 2022　(FI) ..................................... 20225992

(51) Int. Cl.
　G01S 5/04　　　(2006.01)
　G01S 1/08　　　(2006.01)
　G01S 5/02　　　(2010.01)
(52) U.S. Cl.
　CPC .................. G01S 5/04 (2013.01); G01S 1/08 (2013.01); G01S 5/0284 (2013.01)
(58) Field of Classification Search
　CPC . G01S 5/04; G01S 1/08; G01S 5/0284; G01S 2205/02; G01S 5/0081; G01S 3/74;
　　　　　(Continued)

(56)　　　References Cited

U.S. PATENT DOCUMENTS

2015/0296476 A1　10/2015　Wilmhoff et al.
2017/0356979 A1　12/2017　Georgiou et al.
(Continued)

FOREIGN PATENT DOCUMENTS

CN　　113593596　A　* 11/2021　......... G10L 21/0216
CN　　113676831　A　* 11/2021　............ H04W 64/00
(Continued)

OTHER PUBLICATIONS

Suleiman Wassim et al: "Decentralized direction finding using partly calibrated arrays", 21st European Signal Processing Conference (EUSIPCO 2013), EURASIP, Sep. 9, 2013 (Sep. 9, 2013). (Year: 2013).*
Troccoli, Tiago et al: "Implementation of Embedded Multiple Signal Classification Algorithm for Mesh IoT Networks", 2022 International Conference on Localization and GNSS (ICL-GNSS), IEEE, Jun. 7, 2022 (Jun. 7, 2022), pp. 1-7, XP034137690, DOI: 10.1109/ICL-GNSS54081.2022.9797023.
(Continued)

*Primary Examiner* — Umair Ahsan
(74) *Attorney, Agent, or Firm* — Meunier Carlin & Curfman LLC

(57)　　　ABSTRACT

The invention relates to an indoor localization system for a wireless communication network. The system comprises: one or more anchor devices, a central entity, and one or more tag devices. Transmission of signals by the one or more tag devices is controlled so that one signal is transmitted at a time on given radio resource, wherein the tag device transmitting said one signal is the tag device being localized. At least one anchor device is configured to: receive, the signal transmitted by the tag device being localized; determine an estimate of a direction of arrival (DOA) based on the received signal by applying a first power method-based algorithm and a second power method-based algorithm respectively and send the estimated DOA together with DOA metadata to the central entity. The invention relates also to indoor localization methods, an anchor device, a computer program, and a computer readable medium.

11 Claims, 4 Drawing Sheets

(58) Field of Classification Search
CPC ..... G01S 3/46; G01S 5/10; G01S 5/12; G01S 13/765; H04W 64/00; H04W 4/33; G16Y 20/10
See application file for complete search history.

(56) References Cited

U.S. PATENT DOCUMENTS

| | | | | |
|---|---|---|---|---|
| 2019/0162815 | A1* | 5/2019 | Taniguchi | ........... G01S 5/02585 |
| 2019/0280740 | A1 | 9/2019 | Tomioka | |
| 2021/0376891 | A1* | 12/2021 | Tseng | ................... H01Q 21/065 |
| 2022/0155405 | A1 | 5/2022 | Markhovsky et al. | |
| 2022/0224423 | A1 | 7/2022 | Wyville et al. | |
| 2022/0283321 | A1 | 9/2022 | Ng et al. | |
| 2022/0317235 | A1 | 10/2022 | Ye et al. | |
| 2024/0045019 | A1* | 2/2024 | Shin | ........................... G01S 5/14 |

FOREIGN PATENT DOCUMENTS

| | | | | | |
|---|---|---|---|---|---|
| CN | 115346554 | B | * | 10/2025 | ............. H04R 1/406 |
| JP | 2012163418 | A | * | 8/2012 | |
| JP | 2014137226 | A | * | 7/2014 | |
| JP | 2015081824 | A | * | 4/2015 | |
| WO | 2014055294 | A1 | | 4/2014 | |

OTHER PUBLICATIONS

Suleiman, Wassim et al: "Decentralized direction finding using partly calibrated arrays", 21st European Signal Processing Conference (EUSIPCO 2013), EURASIP, Sep. 9, 2013 (Sep. 9, 2013), pp. 1-5, XP032593723.

Chen, Po-Chih et al: "Distributed Algorithms for Array Signal Processing", IEEE Transactions on Signal Processing, IEEE, USA, vol. 69, Aug. 2, 2021 (Aug. 2, 2021), pp. 4607-4622, XP011873916, ISSN: 1053-587X, DOI: 10.1109/TSP.2021.3101015.

Extended European Search Report issued in European App. No. 23207464.1, mailed Apr. 3, 2024.

International Search Report for corresponding application PCT/FI2023/050613, dated on Feb. 13, 2024. 5 pages.

Dikmese S. et al. Reducing computational complexity of eigenvalue based spectrum sensing for cognitive radio. 8th International Conference on Cognitive Radio Oriented Wireless Networks, Washington, DC, USA; ICST—The Institute for Computer Sciences, Social Informatics and Telecommunications Engineering: IEEE, Jul. 8, 2013, pp. 61-67.

Search report from priority Finnish application No. 20225992, May 16, 2023, 2 pages.

* cited by examiner

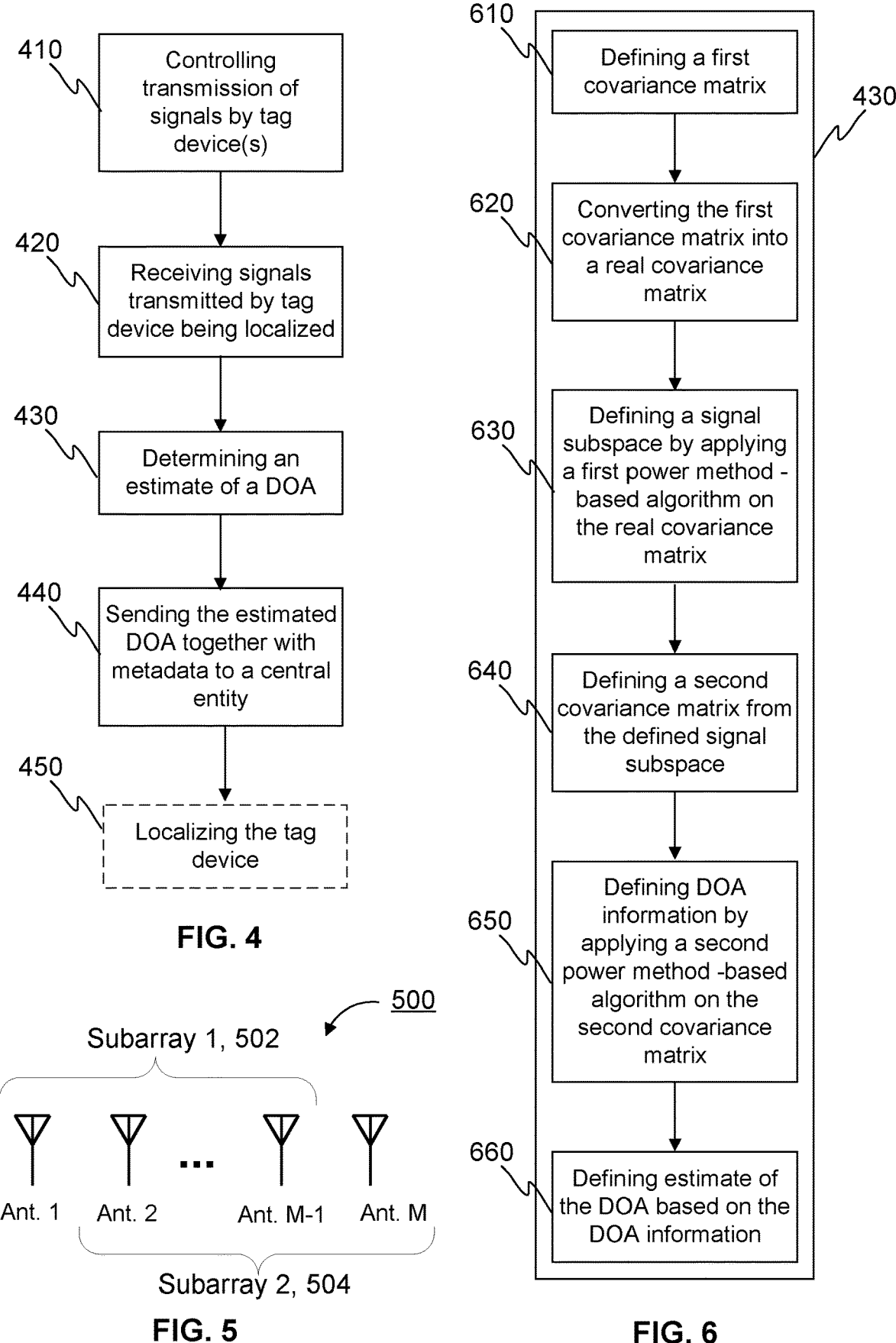

410 Controlling transmission of signals by tag device(s)

420 Receiving signals transmitted by tag device being localized

430 Determining an estimate of a DOA

440 Sending the estimated DOA together with metadata to a central entity

450 Localizing the tag device

Subarray 1, 502

Ant. 1    Ant. 2    ...    Ant. M-1    Ant. M

Subarray 2, 504

FIG. 5

610 Defining a first covariance matrix

430

620 Converting the first covariance matrix into a real covariance matrix

630 Defining a signal subspace by applying a first power method - based algorithm on the real covariance matrix

640 Defining a second covariance matrix from the defined signal subspace

650 Defining DOA information by applying a second power method -based algorithm on the second covariance matrix

660 Defining estimate of the DOA based on the DOA information

FIG. 6

INDOOR LOCALIZATION SOLUTION FOR WIRELESS COMMUNICATION NETWORKS

CROSS REFERENCES

This application claims priority of the Finnish patent application number 20225992 filed on Nov. 4th, 2022.

TECHNICAL FIELD

The invention concerns in general the technical field of wireless communication networks. Especially the invention concerns indoor localization for wireless communication networks.

BACKGROUND

Different direction of arrival (DOA) estimation methods may be found in many applications, such as medical appliances, radar, navigation, military devices, and different indoor localization systems including e.g. Internet of Things (IoT). Typically, in IoT radio communication systems supporting the indoor localization, the indoor localization system may comprise at least two types of devices (e.g. nodes). A first type of the devices are low-cost battery-powered constrained embedded devices, e.g. tag devices, that are being localized. The second type of devices are so-called anchor devices that are fixed in a known location and are used for determining positions of the tag devices. Each anchor device is typically equipped with an array of antennas that receive signals transmitted by the tag devices.

The anchor devices may estimate the DOA from the signals transmitted by the tag devices. Based on multiple DOAs from different anchor devices the locations of the tag devices may be determined. Due to an intrinsic complexity of traditional DOA estimation methods, a reasonable approach may be to execute the estimation of the DOAs in a cloud or by more powerful processing units such as separate processors at the anchor devices. That is impractical in some network topologies, such as mesh IoT networks. If the estimation of the DOAs is done in the cloud, the anchor devices would need to constantly transfer big chunks of measurement data (i.e. the signals) via a wireless communication network (e.g. a mesh network, such as mesh IoT network) to the cloud, e.g. from one node device of the wireless communication network to another node device of the wireless communication network until reaching the destination, i.e. the cloud. This consumes a significant amount radio resources of the wireless communication network and rapidly depleting batteries of the node devices of the wireless communication network. FIG. 1A illustrates schematically an example of executing the traditional DOA estimation method in the cloud 102, wherein the anchor devices 104 transfer the measurement data (i.e. the signals) 101 received from the tag devices 106 via the wireless communication network (e.g. a mesh IoT network) 108 to the cloud 102. The example wireless communication network 108 of FIG. 1A comprises a plurality of node devices (illustrated with white circles forming the network 108 in FIG. 1A) and a gateway device 110 that operates as a gateway between the mesh IoT network 108 and the cloud 102.

The size of such chunks of measurement data may depend on the number of samples per antenna, number of bits per sample, and number of antennas, but it may easily exceed more than one kilobyte. Generally, when the number of antennas, the number of samples, and the number of bits per sample are increased, the more accurate is the DOA estimation and more accurate positioning estimation may be obtained, thus increasing the amount of data to be transferred to the cloud. Another possibility may involve deploying Ethernet cables to the anchor devices. However, that would require an increment in expenses of deployment, as the anchor devices would require wired connectivity. Similarly, using wireless broadband, i.e. Wi-Fi, would increase the price of the anchor devices and the deployment cost as each anchor device would need to have a Wi-Fi chip and each anchor device would need to be in the coverage range of Wi-Fi access point (AP). Additionally, transferring measurement data from a high number of tag devices from multiple anchor devices would consume a significant amount of Wi-Fi network resources.

If the more powerful processor unit is included in each anchor device, the amount of transferred data could be reduced. However, this would increase the cost of the anchor devices. The positioning accuracy based on the DOA is highly dependent on anchor device density and thus increasing the number of the anchor devices performing the DOA estimation for a single tag device may be beneficial. Thus, it is apparent that having a low-cost anchor device implementation as well as a low-cost anchor device deployment would be very attractive when the DOA method is used in large-scale deployments, such as large warehouses, factories, harbors, or even city-wide deployments.

FIG. 1B illustrates schematically an example of executing the traditional DOA estimation method in the anchor device 104, wherein the anchor devices 104 receive the measurement data (i.e. the signals) 101 from the tag devices 106, executes the traditional DOA estimation method, and sends the estimated DOAs of the received measurement data 101 via the wireless communication network (e.g. a mesh IoT network) 108 to the cloud 102, which then defines the localization of the tag devices 106 based on the estimated DOAs. When the DOA estimation is executed by the anchor devices, the anchor device would transfer e.g. only 2-8 bytes instead of kilobytes. However, the implementation of DOA estimation methods in the IoT networks poses a real challenge, since such devices are typically constrained embedded systems with limited computational resources. While in contrast, the DOA estimation methods are typically composed of resource-hungry and time-consuming complex numerical algorithms that may easily lead to a rapid depletion of batteries of the anchor devices, unacceptable execution time and/or computation resource and memory starvation. To achieve even lower cost and easy deployment capabilities, even in locations where mains power is not easily available, the anchor devices may be battery-powered, introducing stringed energy consumption requirements for the anchor devices. However, in such scenarios, the Wi-Fi connectivity, Ethernet cabling, and/or separate high-power processing units are not possible.

There exist several DOA estimation methods, such as Multiple Signal Classification (MUSIC), Space Alternating Generalized Expectation-Maximization (SAGE), Minimum Variance Distortionless Response (MDVR), and Estimation of Signal Parameters via Rotational Invariant Techniques (ESPRIT). ESPRIT is a class of subspace-based techniques and has multiple variations. The accuracy and the performance of the ESPRIT-based DOA estimation methods are superior in comparison to the DOA estimation methods based on beamforming techniques, such as the MDVR. An alternative approach of the DOA estimation methods based on the maximum likelihood approach has performance superior to the subspace-based DOA estimation methods, the maximum likelihood estimation methods are computationally very expensive compared to the DOA estimation methods mentioned above.

In theory, the DOA estimation methods, e.g. the ESPRIT, may estimate multiple DOAs during their execution, so radar applications sending sounding signals and measuring when their own signal is received from different reflections may take full advantage of that capability by identifying multiple copies of their own reflected signal. However, in the IoT radio communication systems, where the anchor devices are employed to locate multiple tag devices, this is not possible in practice with low-cost single receiver anchor devices operating at a single radio frequency (RF) channel at a given time, e.g. in Bluetooth receivers. That is, if more than one tag device transmits a signal to an anchor device, at the same time and frequency resources (e.g. channels), the signal-to-interference and noise ratio would be too low for the single receiver anchor device to detect the transmissions reliably. For example, the anchor device may not be able to decode the transmitter IDs of the tag devices reliably, as each transmission would interfere with the other transmissions. Therefore, in this scenario, the DOA estimation methods may only estimate a single DOA only.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an indoor localization system, indoor localization methods, an anchor device, a computer program, and a computer readable medium for a wireless communication network. Another objective of the invention is that the indoor localization system, the indoor localization methods, the anchor device, the computer program, and the computer readable medium for a wireless communication network enable a simplified indoor localization.

The objectives of the invention are reached by an indoor localization system, indoor localization methods, an anchor device, a computer program, and a computer readable medium as defined by the respective independent claims.

According to a first aspect, an indoor localization system for a wireless communication network is provided, wherein the indoor localization system comprises: one or more anchor devices, a central entity being in a bi-directional communication with the one or more anchor devices via the wireless communication network, and one or more tag devices, wherein transmission of signals by the one or more tag devices is controlled so that one signal is transmitted at a time on given radio resource, wherein the tag device transmitting said one signal is the tag device being localized, wherein at least one anchor device of the one or more anchor devices is configured to: receive, via an antenna array, the signal transmitted by the tag device being localized; determine an estimate of a direction of arrival (DOA) based on the received signal by applying a first power method-based algorithm and a second power method-based algorithm respectively, and send the estimated DOA together with DOA metadata to the central entity via the wireless communication network.

The central entity may be configured to localize the tag device based on the received estimated DOA and the DOA metadata.

The controlling of the transmission of signals by the one or more tag devices may be based on using a medium access control (MAC) functionality.

The MAC functionality may comprise using a random-access procedure or a scheduled procedure.

The first power method-based algorithm may be a power method.

The second power method-based algorithm may be an inverse power method or a power method.

The determination of the estimate of the DOA may comprise that the at least one anchor device is configured to: define a first covariance matrix from IQ samples of the received signal; convert the first covariance matrix into a real covariance matrix; define a signal subspace by applying the first power method-based algorithm on the real covariance matrix; define a second covariance matrix from the defined signal sub-space; define DOA information representing the estimate of the DOA by applying the second power method-based algorithm on the second covariance matrix; and define the estimate of the DOA based on the defined DOA information.

The DOA metadata may comprise: an identifier of the anchor device sending the estimated DOA, coordinates of the anchor device sending the estimated DOA, an identifier of the tag device being localized, a received signal strength indicator (RSSI) information, and/or time information.

According to a second aspect, an indoor localization method for a wireless communication network is provided, wherein the method comprises following steps of: controlling transmission of signals by one or more tag devices so that one signal is transmitted at a time on given radio resource, wherein the tag device transmitting said one signal is the tag device being localized; receiving, by at least one anchor device, via an antenna array, the signal transmitted by the tag device being localized; determining, by the at least one anchor device, an estimate of a direction of arrival (DOA) based on the received signal by applying a first power method-based algorithm and a second power method-based algorithm respectively; and sending, by the at least one anchor device, the estimated DOA together with DOA metadata to the central entity via the wireless communication network.

According to a third aspect, an anchor device for indoor localization is provided, wherein the anchor device comprises: a radio communicator, an antenna array, and a controller, wherein the anchor device is configured to: receive, by the radio communicator via the antenna array, a signal transmitted by a tag device being localized, wherein transmission of signals by one or more tag devices are controlled so that one signal is transmitted at a time on given radio resource, wherein the tag device transmitting said one signal is the tag device being localized; determine, by the controller, an estimate of a direction of arrival (DOA) based on the received signal by applying a first power method-based algorithm and a second power method-based algorithm respectively; and send, by the radio communicator, the estimated DOA together with DOA metadata to the central entity via the wireless communication network.

According to a fourth aspect, an indoor localization method for an anchor device is provided, wherein the method comprises the following steps of: receiving, by a radio communicator of the anchor device, via an antenna array of the anchor device a signal transmitted by a tag device being localized, wherein transmission of signals by one or more tag devices are controlled so that one signal is transmitted at a time on given radio resource, wherein the tag device transmitting said one signal is the tag device being localized; determining, by a controller of the anchor device, an estimate of a direction of arrival (DOA) based on the received signal by applying a first power method-based algorithm and a second power method-based algorithm respectively; and sending, by the radio communicator of the anchor device, the estimated DOA together with DOA metadata to the central entity via the wireless communication network.

According to fifth aspect, a computer program is provided, wherein the computer program comprises instructions, which, when the computer program is executed by a computer, cause the computer to carry out at least the steps of the method described above.

According to a sixth aspect, a tangible, non-volatile computer readable medium is provided, wherein the computer readable medium comprises the computer program described above. Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 4 illustrates schematically an example of an indoor localization method for the wireless communication network.

FIG. 5 illustrates schematically an example of dividing of an antenna array into two subarrays.

FIG. 6 illustrates an example flow chart of a determination of an estimate of the DOA by an anchor device.

DESCRIPTION OF THE EXEMPLIFYING EMBODIMENTS

Figures 1A, 1B:
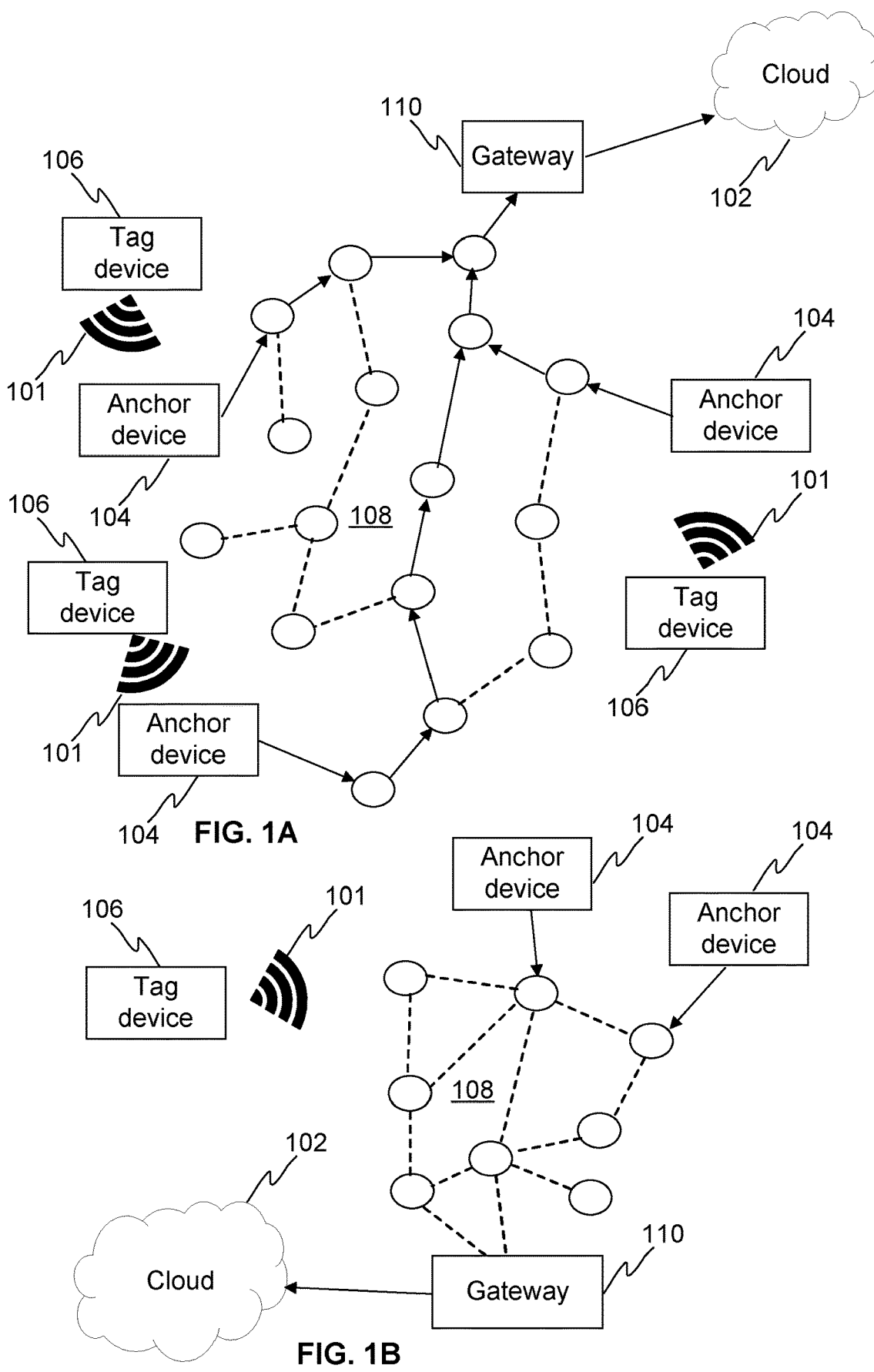
FIG. 1A illustrates schematically an example of executing a traditional direction of arrival (DOA) estimation method in a cloud.
FIG. 1B illustrates schematically an example of executing a traditional DOA estimation method in an anchor device.
Figure 2:
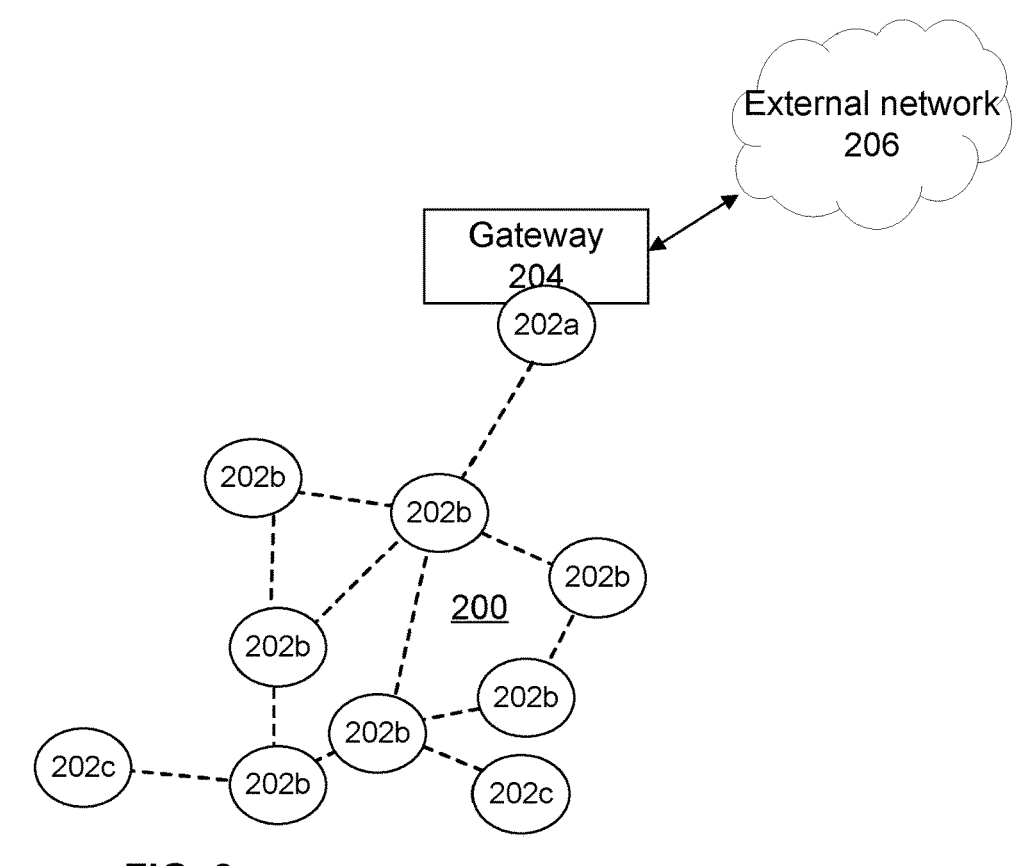
FIG. 2 illustrates an example a wireless communication environment in which an indoor localization system may operate.

FIG. 2 illustrates an example a wireless communication environment in which an indoor localization system 300 may operate. The environment comprises a wireless radio communication network (system) 200, which comprises a plurality of wireless radio communication devices (nodes) 202a-202c. The devices 202a-202c operate on a same spectrum comprising one or more frequency bands at a same geographical area, e.g. within the presented environment. Each of the one or more frequency bands may comprise one or more frequency channels. The use of same spectrum enables a bidirectional radio communication between the devices 202a-202c in the network 200, whereupon radio transmissions transmitted by one device 202a-202c may be received by another device 202a-202c and vice versa.

The indoor localization system 300 may be applied to any wireless communication network 200. Preferably, the indoor localization system 300 may be applied to wireless communication networks 200 that are having low capacity and/or low power consumption requirement. Some non-limiting examples of wireless communication networks 200 having the low capacity and/or the low power consumption requirement to which the indoor localization system 300 may be applied may comprise, but is not limited to, a wireless sensor network (WSN), a wireless communication network complying Digital European Cordless Telecommunications (DECT-2020 NR) standard, a Bluetooth Low Energy (BLE) mesh network, a Zigbee network, a Thread network, a Wireless Local Area Network (WLAN), and/or any other wireless communication networks. Due to the low capacity and/or the low power consumption requirement in many use cases, transferring all measurement data from network nodes (e.g. tag devices) to a central entity (e.g. a cloud entity) having more processing power is not possible or causes degradation for other uses or services in the network 200.

As above has been explained, each device 202a-202c is able to provide, by means of its radio communicator, the bi-directional radio communication with at least one other device 202a-202c. This means that each device 202a-202c may operate as a transmitter, as a receiver, or as a transmitter-receiver when each device 202a-202c is able to transmit at least one message to other device(s) 202a-202c and to receive at least one message from the other device(s) 202a-202c in the network 200.

The network 200 may also comprise at least one gateway device 204, e.g. one, two, three, four, or more gateway devices. Each gateway device 204 operates as a gateway between the network 200 and other external network(s) 206, e.g. a central entity and/or Internet, and delivers data in the network 200 and from the network 200. Each gateway device 204 communicates with at least one sink device (node) 202a, e.g. one, two, three, four, or more sink devices, and each sink device 202a operates as a radio interface for the gateway device 204 in the network 200. The at least one sink device 202a belongs to the plurality of devices 202a-202c of the network 200. Each sink device 202a may locate physically in connection with the gateway device 204 or separately in a different part of the network 200. If the gateway device 204 comprises several sink devices 202a, one may locate in connection with the gateway device 204 and others separately in different parts of the network 200.

The other devices 202b, 202c of the network 200 are able to operate in different fixed or non-fixed roles in the network 200. The other devices 202b, 202c in the network 200 are router devices (routers) 202b, i.e. devices operating in a router role, and non-router devices (non-routers) 202c, i.e. devices operating in a non-router role, depending on whether a device needs to participate in data forwarding. The sink devices 202a and the router devices 202b of the network 200 may participate in the routing operations. Each router device 202b maintains a connectivity of the network 200 and routes 202b forwards data of other devices 202a-202c when necessary. Each non-router device 202c is able to provide a bi-directional communication in order to transmit its own data and to receive data directed for it similarly as sink devices 202a and router devices 202b, but the non-router device 202c does not route data of other devices 202a-202c.

The network 200 comprises the devices 202b, 202c so that all devices 202b, 202c are not able or not preferring to communicate directly with the sink device(s) 202a due to radio conditions, e.g. extensive distance between the devices 202a-202c, interference or signal fading between the devices 202a-202c; or a limited radio range, whereupon it is necessary or preferred by the devices 202a-202c to use multi-link (multi-hop) communication between each device 202b, 202c and the sink device 202a.

Figure 3:
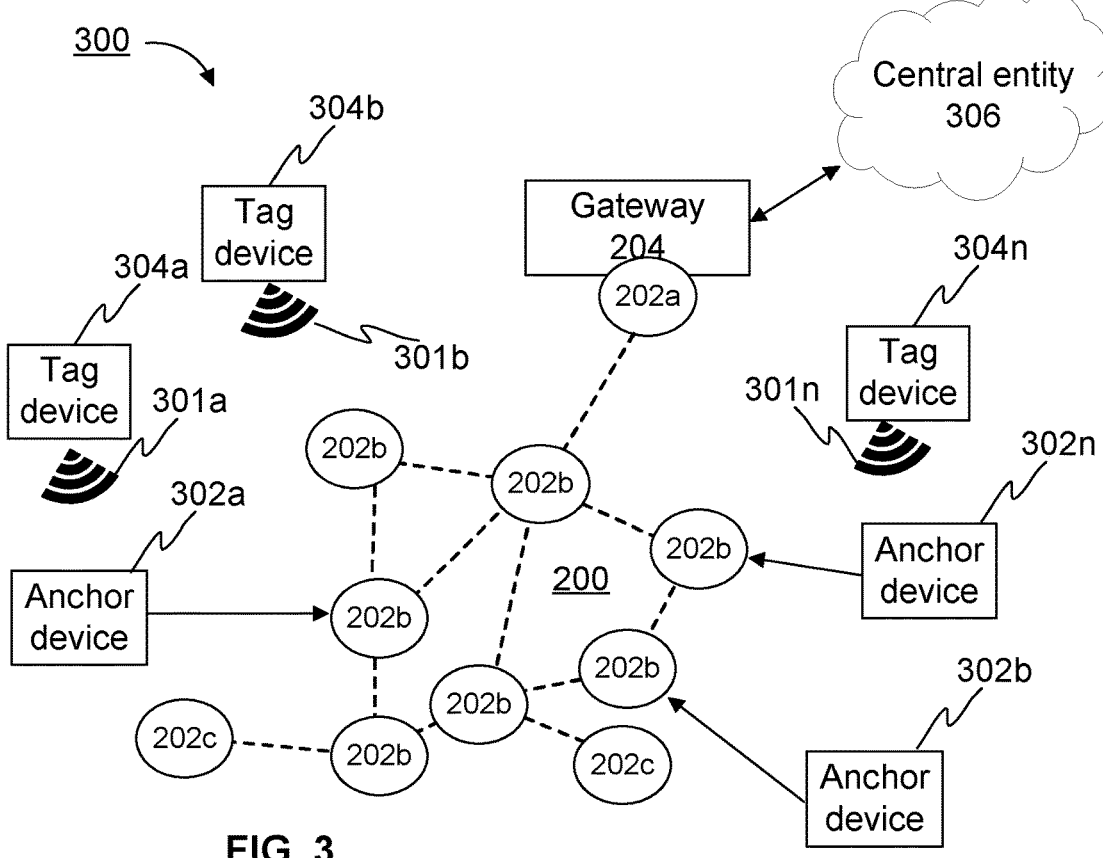
FIG. 3 schematically illustrates an example of an indoor localization system, which operates in the wireless communication network.

FIG. 3 schematically illustrates an example of an indoor localization system 300, which operates in the wireless communication network 200. The indoor localization system 300 comprises one or more anchor devices 302a-302n, one or more tag devices 304a-304n, and a central entity, e.g. a cloud entity, 306. The central entity 306 is in a bi-directional communication with the one or more anchor devices 302a-302n via the wireless communication network 200.

FIG. 4 illustrates schematically an example of an indoor localization method for the wireless communication network 200. FIG. 4 illustrates the indoor localization method as a flowchart. The indoor localization method is mainly explained by using one anchor device 302a and one tag device 304a being localized. However, each anchor device of the one or more anchor devices 302a-302n may be configured to independently perform one or more method steps (i.e. features) of the indoor localization method relevant to the anchor device as will be explained for the one anchor device 302a. Similarly, each tag device of the one or more tag devices 304a-304n may be configured to be localized as will be explained for the one tag device 304a. The indoor localization method is based on direction of arrival (DOA) estimation.

At a step 410, transmission of signals 301a-301n by the one or more tag devices 304a-304n are controlled so that one signal 301a is transmitted at a time on given radio resource (e.g. a frequency channel, or a code), wherein the tag device 304a transmitting said one signal 301a is the tag device 304a being localized. This enables that the transmission of signals 301a-301n by the one or more tag devices 304a-304n are controlled so that collisions of the signals 301a-301n transmitted by the one or more tag devices 304a-304n are avoided. The avoidance of the collision may be based on any collision avoidance technique. The given, e.g. predefined, radio resource may depend on the applied collision avoidance technique. For example, the avoidance technology may be based on using multiple frequency channels, wherein the transmission of the signals 301a-301n by the one or more tag devices 304a-304n may be controlled so that only one signal (e.g. the signal 301a by the tag device 304a) is transmitted on one frequency channel at a time. In other words, on said one frequency channel only one signal is transmitted at a time. However, at the same time one or more other signals 301b-301n may be transmitted at one or more other frequency channels. In other words, simultaneous transmissions of signals 301a-301n on different frequency channels may be transmitted by the one or more tag devices 304a-304c and each of the simultaneous transmissions of signals 301a-301n on the different frequency channels may be received and handled by the at least one anchor device 302a as will be described. According to another example, the avoidance technology may be based on using Code-Division Multiple Access, (CDMA), wherein the transmission of the signals 301a-301n by the one or more tag devices 304a-304n may be controlled so that each tag device 304a-304n is assigned with an individual code, that is also applied in the corresponding signal 301a-301n. In other words, the individual codes enables that only the tag device 304a-304n assigned with the individual code is allowed to transmit at a time by using said individual code. Therefore, simultaneous transmissions of signals 301a-301n by multiple tag devices 304a-304n assigned with different individual codes may be transmitted and each of the simultaneous transmissions of signals 301a-301n transmitted by the multiple tag devices 304a-304n assigned with different individual codes may be received and handled by at least one anchor device 302a similarly as will be described referring to the one signal 301a. The controlling of the transmission of the signals 301a-301n by the one or more tag devices 304a-304n may be based on using a medium access control (MAC) functionality. Any kind of MAC functionality may be used, as long as it provides means to identify the one or more transmitting tag devices 301a-301n and avoid collisions of the transmitted signals 301a-301n. The MAC functionality may for example comprise using a random-access procedure or a scheduled procedure. In the random-access procedure, each router device 202b and sink device 202a of the network 200 announces its random-access channel (RACH) resources, i.e. coming timeslots when it receives data. The RACH resources may be included in beacon messages transmitted by said router/sink device 202a, 202n. Any device that wants to associate with said router/sink device 202a, 202b may then send their data (e.g. data packets comprising e.g. the measurement data, and/or association requests, etc.) during those time slots. The random-access procedure may comprise a use of a Listen Before Talk (LBT) technique and a random backoff. The router/sink device 202a, 202b announcing the time slots does not know which and how many devices are going to use them (i.e. send some data). Therefore, the devices attempting to send data may use the LBT and the random backoff to avoid collisions. The LBT is a short listening period used to check that any other device is not currently sending any data on that frequency channel. If the frequency channel is busy (i.e. another device is currently sending data on that frequency channel), the backoff (i.e. a randomized waiting period) is applied before the try to send the data again. If the frequency channel is not busy, the device is free to send the data. Aa an alternative to the random-access procedure, the scheduled procedure may be used, wherein a base station (BS), an access point (AP), or a router device 202b of the network 200 may schedule time reservations per transmitting device or group of transmitting devices. The use of the scheduling per device enables that the use of the LBT may be avoided. Although the features of the indoor localization method relevant to the tag device is explained by using one tag device 304a, each tag device of the one or more tag devices 304a-304n may be configured to independently perform one or more features relevant to the tag device as is explained for the one tag device 304a.

At a step 420, the anchor device 302a receives via an antenna array 500 a signal 301a transmitted by the tag device 304a being localized. The signal 301a transmitted by the tag device 304a may for example comprise measurement data obtained by the tag device 304a. The antenna array 500 may comprise a plurality of antenna elements. For example, the antenna array 500 may be a uniform linear array of antennas (ULA). Alternatively, the antenna array 500 may also be any other antenna array enabling applying the DOA estimation according to this patent application. Next it is assumed that the antenna array 500 comprises M antenna elements receiving d signals 301a-301n from sources being far-field sources impinging the antenna elements of the antenna array 500 at angles $\theta_1$, $\theta_2$, . . . , $\theta_d$. As discussed above only one tag device 304a is transmitting at a time on the given radio resource, d is one (i.e. d=1). Thus, the antenna elements of the antenna array 500 receive one signal from the tag device 304a being localized impinging the antenna elements of the antenna array at an angle $\theta_1$. In the traditional, i.e. standard, ESPRIT, the antenna elements of the antenna array 500 receive d signals from the sources impinging the antenna elements of the antenna array at angles $\theta_1$, $\theta_2$, . . . , $\theta_d$. Thus, the DOA estimation described in this application may be considered as a simplified, i.e. optimized, ESPRIT. Some of the steps of this simplified ESPRIT may correspond to the steps of the ESPRIT and some of the steps of this simplified ESPRIT may differ from the traditional ESPRIT. In the traditional ESPRIT multiple DOAs are estimated, but as the transmission of signals by the one or more tag devices 304a-304n are controlled in this simplified ESPRIT a single DOA per radio resource is estimated. As a general definition, the DOA is a transmitter (e.g. the tag device 304a) direction measured relative to the line perpendicular to the antenna array 500. The estimated DOA comprises one angle of arrival. For example, the angle of arrival may comprise an azimuth angle, an elevation angle, a zenith angle, or any other angle. The azimuth angle, the elevation angle and the zenith angle are only special cases of the angle of arrival depending on the orientation of the antenna array 500 in 3-D space. The signal 301a transmitted by the tag device 304a may for example be narrowband signal propagated in an Additive white Gaussian noise (AWGN) channel with linear and isotropic transmission medium. Next example definitions (e.g. equations) are described for the traditional ESPRIT, but the same definitions apply also to the simplified ESPRIT with the simplification that d=1. An IQ sample for each source, e.g. the tag device 304a being localized, at a timestamp t may be found by the following equation:

$$x(t) = As(t) + n(t), \tag{1}$$

where $s(t) \in \mathbb{C}^{d \times 1}$ is a vector of signals of d sources, $n(t) \in \mathbb{C}^{d \times 1}$ is a zero-mean spatially correlated additive noise and $A \in \mathbb{C}^{M \times d}$ is the steering matrix, that is:

$$A = [a(\theta_1) a(\theta_2) \dots a(\theta_d)], \tag{2}$$

where $$a(\theta_i)^T = \left[ 1 \ e^{j\mu_1} e^{j2\mu_2} \ \dots \ e^{j(M-1)\mu_d} \right], \tag{3}$$

is an ideal steering vector, where $$\mu_i = \frac{2\pi f_c}{c} \Delta \sin\theta_i,$$

where c is the speed of light, $f_c$ is the carrier frequency, $\theta_i$ is an angle of arrival θ of the i:th signal, and Δ is the distance between two adjacent antenna elements.

As in the traditional ESPRIT, in this simplified ESPRIT the antenna array 500 may be divided into two subarrays 502, 504. The two subarrays 502, 504 are composed of m=M−1 consecutive antenna elements, and M−2 overlapping antenna elements as shown in FIG. 5, which illustrates schematically an example of the dividing of the antenna array 500 into the two subarrays. The subarrays 502, 504 may be formed by multiplying the steering matrix A by $$J_1 = [I_m \ 0_m] \in \mathbb{R}^{m \times M}, \tag{4}$$

$$J_2 = [0_m \ I_m] \in \mathbb{R}^{m \times M},$$

where $I_m$ is the identity matrix and $0_m$ is a column vector of zeroes, both with size m. A shift-invariance propriety of the d steering vectors $\alpha(\theta_i)$ may be expressed as $J_1A\Phi=J_2A$, in which $\Phi=\text{diag}[e^{j\mu_1}, e^{j\mu_2}, \dots, e^{j\mu_d}] \in \mathbb{C}^{d \times d}$.

However, as in the traditional ESPRIT, in this modified ESPRIT instead of computing rotation operation Φ, a subspace rotational operation Ψ may be estimated from a signal subspace $U_S$ as shown in the following equation:

$$J_1 U_s \Psi \approx J_2 U_s, \tag{5}$$

which also comprises information representing the DOA. The equality does not hold in the shift-invariance equation 5, because the signal subspace $U_S$ is estimated from a covariance matrix (as will be described later in this application), which is also an estimation. Therefore, the subspace rotational operation Ψ may be estimated via total least squares (TLS) as will be described more in detail later this application. TLS has a better estimation than least squares (LS), that improves the accuracy which is defined as a difference between the estimated DOA and the actual DOA.

At a step 430, the anchor device 302a determines the estimate of the DOA based on the signal 301a received from the tag device 304a by applying a first power method-based algorithm and a second power method-based algorithm respectively. An example of the determination of the estimate of the DOA is described next by referring to FIG. 6 that illustrates an example flow chart of the determination of the estimate of the DOA by the anchor device 302a at the step 430.

At a step 610, the anchor device 302a defines a first covariance matrix $R_{xx}$ from IQ samples of the received signal 301a. The radio communicator of the anchor device 302a comprises a direct conversion receiver with IQ sampling to provide the IQ samples of the received signal 301a. The anchor device 302a may collect N samples $x(t_n) \in \mathbb{C}^{M \times 1}$ for timestamps $t_1$, $t_2$, . . . , $t_n$. The first covariance matrix $R_{xx}$ may for example be estimated by using the following equation:

$$R_{xx} \approx \hat{R}_{xx} = \left(\frac{1}{N}\right) XX^H, \tag{6}$$

where X=[x($t_1$) x($t_2$) . . . x($t_N$)]∈ $\mathbb{C}^{M \times N}$.

At a step 620, the anchor device 302a converts the first covariance matrix $R_{xx}$ into a real covariance matrix C. The anchor device 302 may convert the first covariance matrix $R_{xx}$ into the real covariance matrix C for example by using the following equation:

$$C = \mathrm{Re}\{Q_M^H \hat{R}_{xx} Q_M\} \in \mathbb{R}^{M \times M}, \tag{7}$$

wherein $Q_M$ is a unitary matrix column conjugate symmetric. For example, $Q_n \in \mathbb{C}^{n \times n}$ being any unitary matrix column conjugate symmetric may be defined by the following equations:

$$Q_{2n} = \frac{1}{\sqrt{2}} = \begin{bmatrix} I_n & jI_n \\ \Pi_n & -j\Pi_n \end{bmatrix}, \tag{8}$$

$$Q_{2n+1} = \frac{1}{\sqrt{2}} = \begin{bmatrix} I_n & 0 & jI_n \\ 0_n^T & \sqrt{2} & 0_n^T \\ \Pi_n & 0 & -j\Pi_n \end{bmatrix}, \tag{9}$$

wherein $\Pi_n$ is an anti-diagonal identity matrix. For example, $\Pi_p \in \mathbb{C}^{p \times p}$ being any anti-diagonal identity matrix may be defined by the following equation:

$$\Pi_p = \begin{bmatrix} 0 & 0 & \dots & 0 & 1 \\ 0 & 0 & \dots & 1 & 0 \\ \dots & \dots & \dots & \dots & \dots \\ 0 & 1 & \dots & 0 & 0 \\ 1 & 0 & \dots & 0 & 0 \end{bmatrix}. \tag{10}$$

At a step 630, the anchor device 302a defines, e.g. calculates, a signal subspace by applying the first power method-based algorithm on the real covariance matrix C. The first power method-based algorithm may be a power method. The method simplifies, e.g. optimizes, the traditional ESPRIT by exploiting one-source radio communication systems limitation (i.e. d=1) as discussed above. Since d=1, it is unnecessary to apply a complex and time-consuming eigendecomposition (EVD) to calculate the signal subspace $U_S$ as in the traditional ESPRIT, because the signal subspace $U_S$ comprises only one eigenvector. In the EVD all eigenvectors are calculated. Instead of the EVD, the signal subspace $U_S$ may be defined by applying the first power method-based, e.g. the power method. The power method is a simple numerical computing algorithm that only defines, e.g. computes, the eigenvalue with the greatest absolute value and its corresponding, i.e. associated, eigenvector, which is the signal subspace $U_S$. This enables saving execution time and memory footprint. To be able to apply the power method, the matrix in which the power method is applied, i.e. an input matrix of the power method, needs to satisfy first convergence requirements. More specifically, the input matrix of the power method converges to the eigenvector of interest, if the input matrix satisfies the first convergence requirements. The first convergence requirements comprise that the input matrix is diagonalizable, only one eigenvalue with the greatest absolute value exists, and that the eigenvalue is a real number. For example, considering $\lambda_i \in \mathbb{R}$, i=1, . . . , M to be eigenvalues, then $|\lambda_1| > |\lambda_2| \geq . . . \geq |\lambda_M|$. The matrix C is a real covariance matrix, thus, it is symmetric and therefore it is diagonalizable, and all its eigenvalues are real numbers. Moreover, since C is a real covariance matrix, it is positive semi-definite, which means all eigenvalues are non-negative. In summary, the power method converges since the input matrix is a real covariance matrix and the DOA is computed in line-of-sight (LOS). The LOS may be through any media, including air. In the LOS, the eigenvalue of the signal subspace $U_S$ is greater than that of the noise subspace, and since the eigenvalues are all non-negative, it is not possible to have eigenvalues of the noise subspace equal to or greater than one of signal subspace $U_S$ in magnitude. Therefore, the eigenvalue of the signal subspace $U_S$ is the greatest in magnitude.

At a step 640, the anchor device 302a defines a second covariance matrix E from the defined signal subspace $U_S$. The second covariance matrix E may be defined by using the following equation:

$$E = \begin{bmatrix} (K_1 U_S)^T \\ (K_2 U_S)^T \end{bmatrix} [(K_1 U_S) \ (K_2 U_S)], \tag{11}$$

wherein $$K_1 \triangleq 2\mathrm{Re}\{Q_m^H J_2 Q_M\} \text{ and } K_2 \triangleq 2Im\{Q_m^H J_2 Q_M\}$$

are defined as a unitary transformation of $J_1$ and $J_2$, respectively.

At a step 650, the anchor device 302a defines DOA information Y representing the estimate of the DOA by applying the second power method-based algorithm on the second covariance matrix. The second power method-based algorithm may be an inverse power method. Alternatively, the second power method-based algorithm may be a power method. The second covariance matrix E has a size of 2×2, since d=1. As a result, the right sub-matrix of its eigenvector matrix V, that is $[V_{12} \ V_{22}]^T$ is a vector of size 2. Since these elements are scalars, the sub-matrix may be defined to $[v_{12} \ v_{22}]^T$. Instead of applying the EVD (as in the traditional ESPRIT), which is a complicated numerical method, the anchor device 302a applies the second power method-based algorithm on the second covariance matrix E. For example, the anchor device 302a may apply the inverse power method on the second covariance matrix E, the inverse power method defines, e.g. computes, the smallest eigenvalue in magnitude and its corresponding eigenvector, which is the vector $[v_{12} \ v_{22}]^T$.

To be able to apply the inverse power method, the matrix in which the inverse power method is applied, i.e. an input matrix of the inverse power method, needs to satisfy second convergence requirements. The second convergence requirements comprises that the input matrix is non-singular, and it must have only one smallest real eigenvalue in modulus. For example, $|\lambda_1| > |\lambda_2|$, for d=1. Since, the second covariance matrix E is a real covariance matrix, therefore the second covariance matrix E is a real symmetric matrix having real eigenvalues, more specifically the second covariance matrix E is positive semi-definite. The second covariance matrix E could be positive definite, if the vectors $K_1 U_S$ and $K_2 U_S$ are linear independent. In that case, the second covariance matrix E is non-singular. However, if $K_1 U_S \approx K_2 U_S$ the second covariance matrix E could be "almost singular" (ill-conditioned). To make sure that the second covariance matrix E is always non-singular, it should be turned into a positive definite matrix. By taking advantage of the positive semi-definiteness characteristics of the second covariance matrix E, it may be turned into the positive definite matrix by applying a well-known simple method comprising a small perturbation, that is, $E \approx E + \alpha I_{2d}$, in which α should be a small positive number to make the perturbed matrix close to the non-perturbed one. Assuming the matrix E, after the perturbation, to have only one smallest eigenvalue, it is possible to apply the inverse power method. Preferably, the anchor device 302a defines only the eigenvector, because in this simplified ESPRIT there is no need to use the eigenvalue in the determination of the estimate of the DOA, which is one benefit of the simplified ESPRIT in comparison to the traditional ESPRIT. The inverse power method needs to compute a solution of a linear equation for each iteration which would require an iterative algorithm to solve a linear system, for example, a Gaussian Elimination or LU (Lower-Upper) decomposition. The linear system may be considered to have elements of the following equation:

$$\begin{bmatrix} a_{11} & a_{12} \\ a_{21} & a_{22} \end{bmatrix} \begin{bmatrix} x_1 \\ x_2 \end{bmatrix} = \begin{bmatrix} a \\ b \end{bmatrix}. \tag{12}$$

However, since E has a size of 2×2, the iterative algorithm is not needed, instead the solution of the linear equation may be analytically found by using the following equation:

$$\begin{cases} x_1 = \dfrac{a_{22}a - a_{12}b}{a_{11}a_{22} - a_{12}a_{21}} \\ x_2 = \dfrac{a_{11}b - a_{21}a}{a_{11}a_{22} - a_{12}a_{21}} \end{cases}. \tag{13}$$

Because the solution of the linear equation may be found analytically, there is no need to use any numerical methods, such as Gaussian elimination algorithm, to solve the linear system. As mentioned previously, the output of the inverse power method is the eigenvector associated with the smallest eigenvalue of the covariance matrix E, that is $[v_{12}\ v_{22}]^T$. The DOA information Y may be found as in the following equation:

$$Y = -\left(\frac{v_{12}}{v_{22}}\right) \tag{14}$$

As discussed above, the power method may also be applied instead of the inverse power method as the second power method-based algorithm. Since E is a 2×2 real symmetric matrix with distinct eigenvalue assumption, its two eigenvectors are orthogonal to each other. Thus, applying the power method in the second covariance matrix E results in a vector $v \in \mathbb{R}^2$. Any vector orthogonal to v may be the eigenvector corresponding to the smallest eigenvalue. However, the execution time, accuracy, and memory consumption of using the power method to define the DOA information are substantially the same as with the inverse power method.

At a step 660, the anchor device 302a defines the estimate of the DOA based on the defined DOA information Y. The estimate of the DOA may for example be defined by using the following equation:

$$\hat{\theta} = \arcsin\left(-\frac{\lambda\mu}{2\pi\Delta}\right), \tag{15}$$

where μ=arctan(Y), and where λ is the signal wavelength, where $$\lambda = \frac{f_c}{c}. $$

At a step 440, the anchor device 302a sends, e.g. reports, the estimated DOA together with DOA metadata to the central entity 306, e.g. the cloud entity, via the wireless communication network 200 for the localization of the tag device 304a. The estimated DOA and the DOA metadata may for example be sent to the central entity 306 in a measurement report comprising the estimated DOA and the DOA metadata. The anchor device 302a may perform the estimation of the DOA described above multiple times (i.e. two or more times) to estimate multiple DOAs (i.e. two or more DOAs). In that case, the measurement report may comprise multiple estimated DOAs. Alternatively, each estimated DOA of the multiple DOAs may be reported in a separate measurement report. In other words, if the anchor device 302a estimates multiple DOAs, one or more estimated DOAs of the multiple estimated DOAs may be included in the same measurement report. The DOA metadata may for example comprise: an identifier of the anchor device 302a sending the estimated DOA, coordinates of the anchor device 302a sending the estimated DOA, an identifier of the tag device 304a being localized, a received signal strength indicator (RSSI) information, and/or time information. The time information may for example be a time of the DOA estimation or a time since the DOA estimation. If the time information comprises the time since the DOA estimation, the anchor device 302a may already set a value greater than zero for the time information in the measurement report, because there may be some time spent between the DOA estimation and sending the DOA estimation to the central entity 306. Alternatively or in addition, each router device 202b of the wireless communication network 200 may then add to the time since the DOA estimation the time they used for forwarding the measurement report. The identifier of the anchor device 302a sending the estimated DOA may limit the location of the tag device being localized already substantially, if the indoor localization system 300 has the knowledge in which location each anchor device 302a is. The RSSI information may for example be used for estimating whether the tag device 304a is close or further away from the anchor device 302a. Alternatively or in addition, the RSSI information may be useful, if the DOA estimation does not succeed for some reason. The DOA metadata may relate to at least one estimated DOA. For example, a simplified DOA metadata comprising only the identifier of the tag device 304a being localized may be reported together with multiple DOAs estimated subsequently.

Furthermore, the indoor localization method may further comprise in response to receiving the measurement report comprising the estimated DOA and the DOA metadata from the anchor device 302a, localizing by the central entity 306, e.g. by the cloud entity, the tag device 304a based on the received estimated DOA and DOA metadata. This is illustrated with a step 450 in FIG. 4. The central entity 306 is able to define a rough estimate of the location of the tag device 304a being localized, if the location of the anchor device 302a (and possibly also the RSSI information) is known. However, by using the estimated DOA defined and received from the anchor device 302a, the accuracy of the defined estimate of the location of the tag device 304a being localized may be improved. To be able to define a true direction of the tag device 304a to be localized in relation to the anchor device 302a sending the estimated DOA, the anchor device 302a may need to be installed in a certain orientation, e.g. in horizontal and/or vertical manner, and/or certain part pointing always towards certain point of the compass, e.g. the north. Alternatively or in addition, using more than one antenna array 500 or an antenna array 500 having a shape that enables estimating two or more DOAs of different directions may be applied to provide more data for the localization purpose For example, with an L-shaped antenna array 500 formed by two rows of the antenna elements enables to estimate the DOA comprising angles in two directions. The localization of the tag device 304a by the central entity 306a by using the received estimated DOA and DOA metadata may be based on any known localization calculation methods. According to an example localization calculation method, the central entity 306 may localize the tag device 304a by first defining an estimate of a location of the anchor device 302a sending the estimated DOA (with a rough accuracy, e.g. with an accuracy of 100 meters, depending on the used radio communicator), e.g. by using the coordinates of the anchor device 302a, then by using the estimated DOA to determine a direction or a sector of the tag device 304a being localized in relation to the anchor device 302a sending the estimated DOA (e.g. towards a specific point of compass, e.g. towards north west), and finally by using the RSSI information to estimate the distance of the tag device 304a being localize to the anchor device 302a sending the estimated DOA (e.g. less than few meters, e.g. less than 5 meters).

Alternatively, multiple anchor devices 302a-302n may be used to triangulate an exact location of the tag device 304a being localized based on the measurement reports send by the multiple anchor devices 302a-302n. The use of the multiple anchor devices 302a-302n (i.e. the measurement reports send by the multiple anchor devices 302a-302b) improves further the accuracy of the defined estimate of the location of the tag device 304a being localized.

Figure 7:
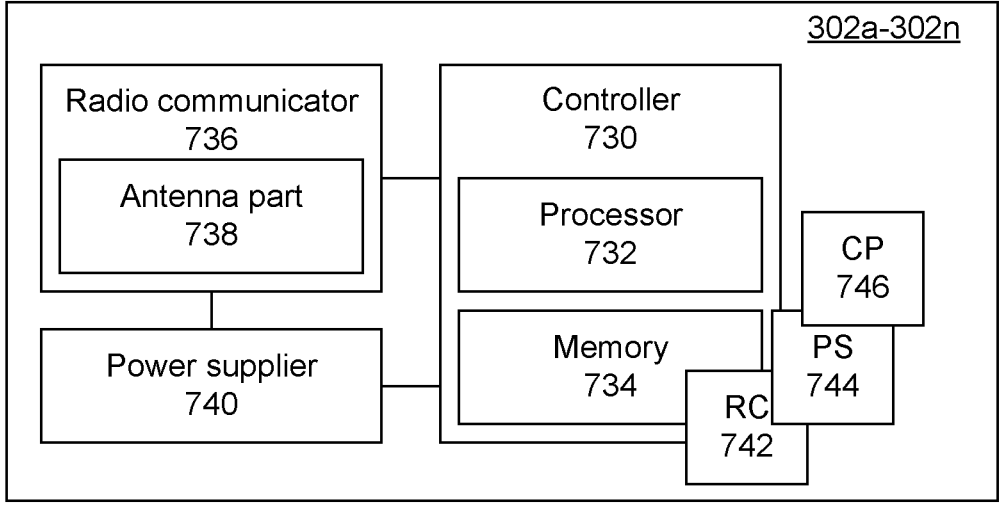
FIG. 7 illustrates schematically an example of operational parts of an anchor device.

FIG. 7 illustrates schematically an anchor device 302a-302n that is able to communicate in the network 200 and to perform the relevant features (steps) of the indoor localization method as above has been explained. In other words, the device that is able to operate as the anchor device 302a-302n and to perform the features of the indoor localization method relevant to the anchor device 302a as above has been explained.

The anchor device 302a-302n comprises the controller (control part) 730 that controls operations of its parts 732, 734, 736, 738, 740 so that the anchor device 302a-302n operates as above has been explained.

The controller 730 comprises a processor (processor part) 732 that performs operator-initiated and/or computer program-initiated instructions, and processes data in order to run applications. The processor 732 may comprise at least one processor, e.g. one, two, three, four, or more processors.

The controller 730 also comprises the memory (memory part) 734 in order to store and to maintain data. The data may be instructions, computer programs, and data files. The memory 734 comprises at least one memory, e.g. one, two, three, four, or more memories.

The anchor device 302a-302n also comprises the radio communicator (radio communication part, data transferer) 736 and an antenna (antenna part) 738 that the controller 730 uses in order to send commands, requests, messages, and data to at least one other device in the indoor localization system 300 and/or in the network 200 via the antenna 738. The radio communicator 736 also receives commands, requests, and data from at least one other device in the indoor localization system 300 and/or in the network 200 via the antenna 738. The antenna part 738 comprises at least the antenna array 500. The communication between the radio communicator 736 of the anchor device 302a-302n and other device in the indoor localization system 300 and/or in the network 200 is provided through the antenna 738 wirelessly.

The anchor device 302a-302n may further comprise a power supplier (power supply part) 740. The power supplier 740 comprises components for powering the anchor device 302a-302n, e.g. a battery and a regulator.

The memory 734 stores at least a radio communication (RC) application 742 for operating (controlling) the radio communicator 736, and a power supply (PS) application 744 for operating the power supplier 740.

The memory 734 also stores a computer program (CP) (i.e. computer software, computer application) 746, which uses at least one of parts 736, 738, 740 in order to perform at least the operations of the anchor device 302a-302n explained above in context of the previous figures, when it is executed (run) in a computer, e.g. in the anchor device 302a-302n, by means of the controller 730.

The computer program 746 may be stored in a tangible, non-volatile computer-readable storage medium, e.g. a Compact Disc (CD) or Universal Serial Bus (USB)-type storage device.

Figure 8:
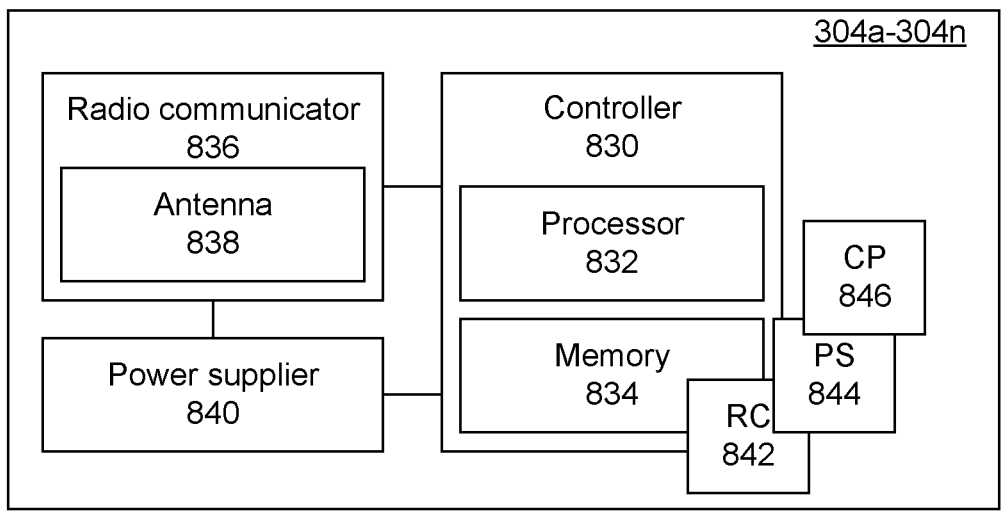
FIG. 8 illustrates schematically an example of operational parts of a tag device.

FIG. 8 illustrates schematically a tag device 304a-304n that is able to communicate in the network 200 and to perform the relevant features (steps) of the indoor localization method as above has been explained. In other words, the device that is able to operate as the tag device 304a-304n and to perform the features of the indoor localization method relevant to the tag device 304a as above has been explained.

The tag device 304a-304n comprises the controller (control part) 830 that controls operations of its parts 832, 834, 836, 838, 840 so that the tag device 304a-304n operates as above has been explained.

The controller 830 comprises a processor (processor part) 832 that performs operator-initiated and/or computer program-initiated instructions, and processes data in order to run applications. The processor 832 may comprise at least one processor, e.g. one, two, three, four, or more processors.

The controller 830 also comprises the memory (memory part) 834 in order to store and to maintain data. The data may be instructions, computer programs, and data files. The memory 834 comprises at least one memory, e.g. one, two, three, four, or more memories.

The tag device 304a-304n also comprises the radio communicator (radio communication part, data transferer) 836 and an antenna (antenna part) 838 that the controller 830 uses in order to send commands, requests, messages, and data to at least one other device in the indoor localization system 300 and/or in the network 200 via the antenna 838. The radio communicator 836 also receives commands, requests, and data from at least one other device in the indoor localization system 300 and/or in the network 200 via the antenna 838. The communication between the radio communicator 836 of the tag device 304a-304n and other device in the indoor localization system 300 and/or in the network 200 is provided through the antenna 838 wirelessly.

The tag device 304a-304n may further comprise a power supplier (power supply part) 840. The power supplier 840 comprises components for powering the tag device 304a-304n, e.g. a battery and a regulator.

The memory 834 stores at least a radio communication (RC) application 842 for operating (controlling) the radio communicator 836, and a power supply (PS) application 844 for operating the power supplier 840.

The memory 834 also stores a computer program (CP) (i.e. computer software, computer application) 846, which uses at least one of parts 836, 838, 840 in order to perform at least the operations of the tag device 304a-304n explained above in context of the previous figures, when it is executed (run) in a computer, e.g. in the tag device 304a-304n, by means of the controller 830.

The computer program 846 may be stored in a tangible, non-volatile computer-readable storage medium, e.g. a Compact Disc (CD) or Universal Serial Bus (USB)-type storage device.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An indoor localization system for a wireless communication network, the indoor localization system comprises:
one or more anchor devices,
a central entity being in a bi-directional communication with the one or more anchor devices via the wireless communication network, and
one or more tag devices, wherein transmission of signals by the one or more tag devices is controlled so that one signal is transmitted at a time on given radio resource, wherein the tag device transmitting said one signal is the tag device being localized,
wherein at least one anchor device of the one or more anchor devices is configured to:
receive, via an antenna array, the signal transmitted by the tag device being localized;
determine an estimate of a direction of arrival (DOA) based on the received signal by applying a first power method-based algorithm and a second power method-based algorithm respectively, wherein the first power method-based algorithm is a power method, and wherein the second power method-based algorithm is an inverse power method or the power method, and
send the estimated DOA together with DOA metadata to the central entity via the wireless communication network.

2. The indoor localization system according to claim 1, wherein the central entity is configured to localize the tag device based on the received estimated DOA and the DOA metadata.

3. The indoor localization system according to claim 2, wherein the controlling of the transmission of signals by the one or more tag devices is based on using a medium access control (MAC) functionality.

4. The indoor localization system according to claim 3, wherein the MAC functionality comprises using a random-access procedure or a scheduled procedure.

5. The indoor localization system according to claim 1, wherein the determination of the estimate of the DOA comprises that the at least one anchor device is configured to:
define a first covariance matrix from IQ samples of the received signal;
convert the first covariance matrix into a real covariance matrix;

define a signal subspace by applying the first power method-based algorithm on the real covariance matrix;
define a second covariance matrix from the defined signal subspace;
define DOA information representing the estimate of the DOA by applying the second power method-based algorithm on the second covariance matrix; and
define the estimate of the DOA based on the defined DOA information.

6. The indoor localization system according to claim 1, wherein the DOA metadata comprises: an identifier of the anchor device sending the estimated DOA, coordinates of the anchor device sending the estimated DOA, an identifier of the tag device being localized, a received signal strength indicator (RSSI) information, and/or time information.

7. An indoor localization method for a wireless communication network, the method comprises following steps of:
controlling transmission of signals by one or more tag devices so that one signal is transmitted at a time on given radio resource, wherein the tag device transmitting said one signal is the tag device being localized;
receiving, by at least one anchor device, via an antenna array, the signal transmitted by the tag device being localized;
determining, by the at least one anchor device, an estimate of a direction of arrival (DOA) based on the received signal by applying a first power method-based algorithm and a second power method-based algorithm respectively, wherein the first power method-based algorithm is a power method, and wherein the second power method-based algorithm is an inverse power method or the power method; and
sending by the at least one anchor device, the estimated DOA together with DOA metadata to a central entity via the wireless communication network.

8. An anchor device for indoor localization, the anchor device comprises:
a radio communicator,
an antenna array, and
a controller,
wherein the anchor device is configured to:
receive, by the radio communicator via the antenna array, a signal transmitted by a tag device being localized, wherein transmission of signals by one or more tag devices are controlled so that one signal is transmitted at a time on given radio resource, wherein the tag device transmitting said one signal is the tag device being localized;
determine, by the controller, an estimate of a direction of arrival (DOA) based on the received signal by applying a first power method-based algorithm and a second power method-based algorithm respectively, wherein the first power method-based algorithm is a power method, and wherein the second power method-based algorithm is an inverse power method or the power method; and
send, by the radio communicator, the estimated DOA together with DOA metadata to a central entity via a wireless communication network.

9. An indoor localization method for an anchor device of claim 8, wherein the method comprises the following steps of:
receiving, by a radio communicator of the anchor device, via an antenna array of the anchor device a signal transmitted by a tag device being localized, wherein transmission of signals by one or more tag devices are controlled so that one signal is transmitted at a time on given radio resource, wherein the tag device transmitting said one signal is the tag device being localized;

determining, by a controller of the anchor device, an estimate of a direction of arrival (DOA) based on the received signal by applying the first power method-based algorithm and the second power method-based algorithm respectively; and sending, by the radio communicator of the anchor device the estimated DOA together with DOA metadata to a central entity via the wireless communication network.

10. A computer program comprising instructions, which, when the computer program is executed by a computer, cause the computer to carry out at least the steps of the method according to claim 9.

11. A tangible, non-volatile computer readable medium comprising the computer program according to claim 10.

* * * * *